3,216,910
CONTROLLED AIR BLEED FLASH EVAPORATOR

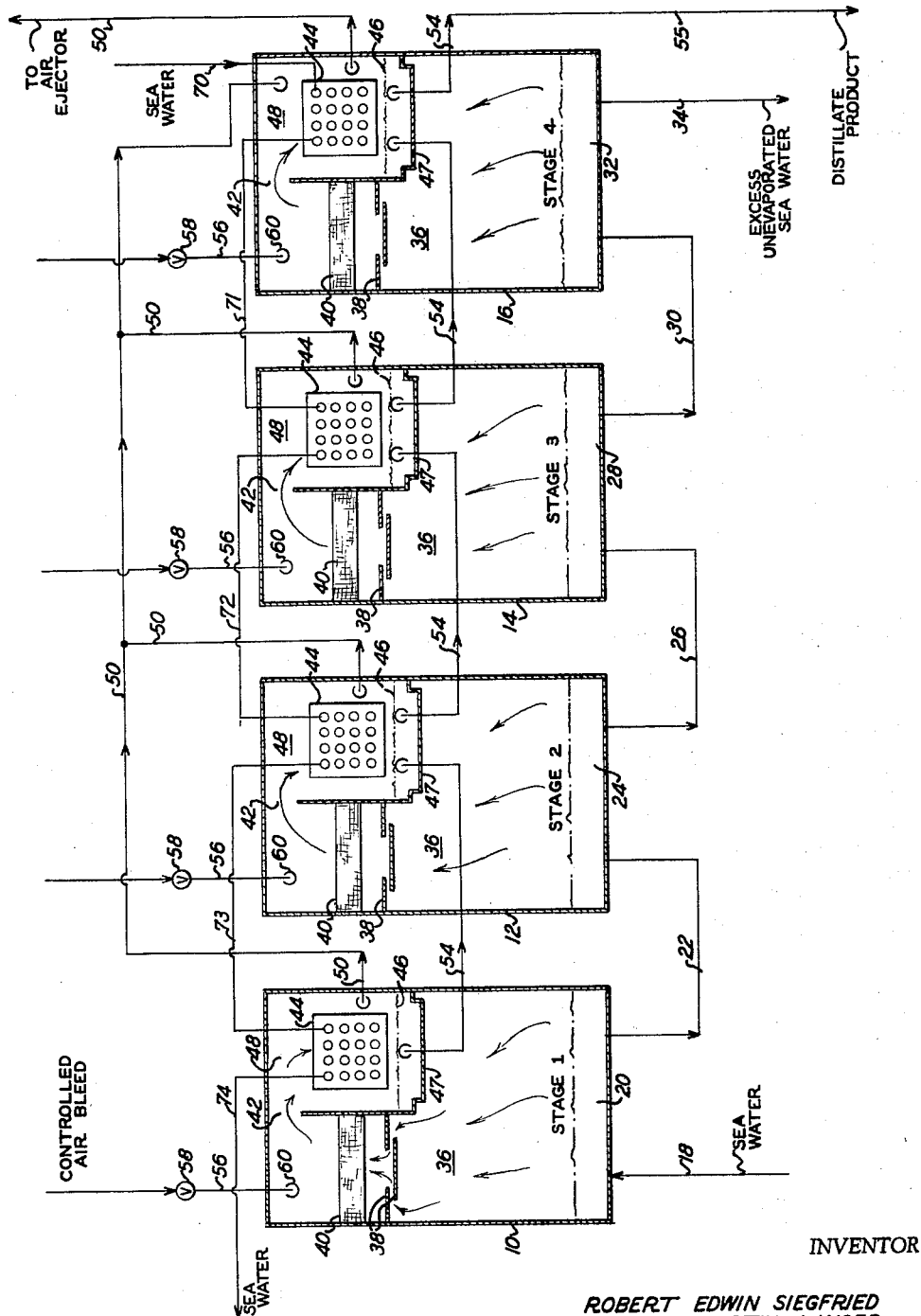

Robert Martin Langer, Boston, and Robert Edwin Siegfried, Lexington, Mass., assignors to The Badger Company, Inc., Cambridge, Mass., a corporation of Massachusetts
Filed July 25, 1962, Ser. No. 212,191
2 Claims. (Cl. 202—173)

This invention relates to multiple stage flash evaporation, and particularly to a controlled air bleed mounted in each stage to permit balancing of evaporation effected in each of the several stages.

While the invention is conveniently described in respect to the evaporation of sea water to produce distilled water, it can be applied to evaporation of any solution which contains non-volatile solutes to produce pure solvent, and especially to a solution which contains solutes which may precipitate upon heating of the solution.

Multiple stage flash evaporators include a condenser for each stage, usually designed with a suitable fouling factor for scale build-up to allow extended use without cleaning of the condenser tubes. In more modern design of flash evaporators, evaporated vapors are often contacted with de-entrainment devices comprising one or more reversals of direction of flow of vapors, and a metallic screen or maze of metal filaments which entrap and drip water droplets which contain saline components, and which can be entrained in the vapors as a result of rapid evaporation. Trapping removal of such liquid droplets from the vapors tends to reduce the salinity of distillate product by reduced carryover of saline droplets. A certain amount of dissolved non-condensible gases are expelled from the sea water with the evaporated vapors, and a certain amount of air leaks into each stage maintained under subatmospheric presure from the outside of the evaporator. These non-condensible gases collect around condenser tube bundles and are removed conventionally through a needle valve in a pipe connected to the condenser tube bundle by a vacuum-creating device, such as a steam-operated ejector or a vacuum pump.

The areas for vapor flow in the flash chamber and through the de-entrainment devices are sized for the operating pressure and temperature in each stage so as to give efficient removal of entrained sea water droplets over a reasonably wide range of vapor flow rates. However, if the vapor flow rate should be above or below the range of efficient de-entrainment in a particular stage, the condensate will contain an excessive amount of saline components, say in excess of 4.25 p.p.m.

When the condensers are clean, and each stage is tightly constructed so that no more than normal air leakage into each stage is encountered, and if the incoming sea water contains no more than narmal amounts of non-condensible gases, each condenser then has a capacity for heat transfer greater than that for which it was designed due to the absence of scale on the tubes. Under such circumstances, each stage will satisfy its own heat transfer capability by (1) condensing more vapor, or (2) subcooling the condensate more, or (3) a combination of (1) and (2). If the condenser of one stage condenses a substantially greater amount of vapor than would be the case under design (scaled) conditions, the vapor velocity through the components of the stage may exceed the upper limit of the acceptable range of vapor flow rates. Since the total condensate produced by all stages combined is usually fixed by other considerations, such as the amount of heating steam available or the demand for condensate, one of the other stages may be condensing an amount of vapor substantially less than the lower limit of the acceptable range of vapor flow rates. This latter stage would then satisfy its heat exchange capability by subcooling the condensate produced therein. However, the low rate of condensation in this latter stage may also be caused by an excessive leakage of air therein, which, by partial blanketing of the surface of the condenser with air, can substantially reduce its heat transfer capacity. This would be in substantial contrast to first mentioned stage, free from excessive air leaks, and thus producing an excessive amount of vapor and condensate.

The heat transfer capacity of the condenser of the first mentioned stage might be reduced to within acceptable limits of vapor flow rate in the stage and its de-entrainment devices by adjusting a needle valve to remove less non-condensible gases from the condenser bundle of this stage. This would have the effect of forcing non-condensible gases to blanket part of the surface of the condenser ad thus reduce its efficient condensation of vapor. However, in practice it has been found that this method is unworkable due to instability of a given needle valve opening, the quantity of non-condensible gases available for removal in any case being very small, and thus a small change in the amount of non-condensible gases entering the condenser will greatly change the effective blanketing of the surface of the condenser.

According to this invention, it is now found that a group of flash evaporator stages can be very readily balanced by mounting a small air-bleed valve before the condenser, and preferably, after the de-entraining devices, each air-bleed being adjustable to introduce a small, controlled quantity of air into each stage.

The controlled introduction of air, supplementing that being evolved from the sea water being flashed and that leaking into the stage, produces therewith a controlled insulating blanket of gas about the condenser tubes, reducing its heat transfer capacity as desired to easily set said heat transfer capacity as substantially equal to that of the condensers of the other stages. In this manner, therefore, the entire group of condensers may be balanced by controlled introduction of air in greater or lesser quantity to each of the stages.

While each of the evaporator stages may have the air bleed manually controlled, these may also be automatically controlled as well by having any of the group of valves activated to increased or reduced air bleed, automatically responsive to lowered or raised absolute pressure in its particular stage.

The invention is further described in relation to the drawing of which the single figure illustrates several stages of a multi-stage flash evaporator for distilling water from sea water.

Referring to the drawing:

Four stages 10, 12, 14, and 16, respectively, comprising a four-stage flash evaporator system are interconnected diagrammatically as shown to pass the entering brine such as sea water through line 18 into the first stage 10, a portion of the sea water being evaporated under the generally reduced pressure maintained therein in a flash evaporation from the body of water 20 contained in the bottom thereof. Partially evaporated water or brine concentrate is withdrawn through line 22 and sent to the second stage evaporator 12 of the series, and further concentrated brine 24 in the bottom thereof leaving by line 26 enters the third stage to form the body of concentrated brine 28 at the bottom thereof. The brine evaporation continues in series to leave by line 30 and enter the fourth stage evaporator 16, there collecting as the bottom layer 32, the most concentrated brine then being withdrawn from the system through line 34.

The vapors above the flash evaporating liquid, in space 36, despite the de-entrainment space provided therein, usually entrain some droplets of sea water which are removed from the vapor stream by having the stream's direction of flow reversed one or more times by baffling devices similar to plates 38 and by catching the droplets on a metallic screen or maze 40, the ascending vapors passing overhead through an opening 42 into a condenser chamber 48 into contact with a bundle of condenser tubes 44 upon which the water vapors are condensed and collect as a pool of distillate water 46 in a sump 47 at the bottom of the condensate chamber 48. Dissolved inert gases in the brine become evolved and tend to collect, together with air which leaks into the stage, as a blanket of gas in the condenser chamber 48 normally surrounding and tending to insulate the condenser tubes 44. Consequently, the collected air is continuously removed through line 50, the line 50 connecting with an air ejector (not shown) which is operated to pump accumulated air from the system.

The distillate water 46 collecting below each condenser in a condensate sump 47 is removed through line 54 passing from stage to stage and is withdrawn ultimately as distillate product through line 55. Sampling of water to determine salinity is applied in each sump 47 in order to determine which stage, if any, is producing water with an excessive content of the saline component. In a similar manner each subsequent stage evaporates the concentrated brine component 24, 28 or 32, trapping off entrained water droplets in maze 40, the vapors of each being condensed by each bundle of condenser tubes 44.

The heat of condensation of the vapors in the bundles of condenser tubes 44 is usually absorbed in multi-stage flash evaporators by cold sea water, which is circulated for cooling the condenser tubes passing in series through the tubes of the four bundles. For this purpose the cold sea water enters the bundle 44 of the fourth stage 16 through line 70 and leaves through line 71, which feeds the sea water to bundle 44 of the third stage 14. In a similar manner, it passes then through the remaining bundles by line 72 to the second, leaving by 73 and passing to the first stage, finally being withdrawn through line 74.

As thus described, a typical multiple stage flash evaporation takes place, the progressively concentrated brine or sea water passing from stage to stage with condensed distillate water from each stage being withdrawn through line 54, and accumulated air and non-condensible gas in each stage being withdrawn through line 50, the system being operated under a vacuum.

The tendency, as pointed out, is for one or more stages to evaporate and condense distillate at such a high or low rate that entrained droplets are carried over, giving an excessive salinity to the water condensed in the overactive or underactive stage. While a certain amount of control to balance the several stages is theoretically available through operating a needle valve installed in line 50, removing more or less of the collected gases about each of the condenser bundles selectively, that control is not practical, as explained above.

To remedy this situation, air bleed lines 56 communicating with the atmosphere through needle valves 58 are mounted in each stage, the air being bled into the system through a connection 60 at a point between the condenser tubes 44 and the screen or maze 40, usually just above the screen or maze. The rate of air bleed into the system is controlled at this point by the valves 58, each independent of the other whereby each may pass a different quantity of air into the stage as needed for control purposes of the particular stage.

It is preferred to control each stage by an indirect measurement of the amount of vapors condensed in each stage and to check the success of adjustment by the measured salinity of the combined condensate from each stage. This indirect measurement of the amount of vapors condensed in each stage can be made by measuring the temperature of the cold sea water in lines 70, 71, 72, 73, 74. The rise in temperature across each bundle should be approximately equal in order to assure approximately equal condensation in each stage. If it is found that the temperature rises across a given bundle is appreciably higher than across the other bundles, air would be bled more rapidly into the given stage until the rise across the given bundle approximately equals that across the other bundles. If the temperature rise across a given bundle is appreciably lower than across the other bundles, the amount of air bled into the given stage is reduced. If this procedure does not sufficiently increase the temperature rise across the given bundle, more air may be bled into the other stages.

The success of the procedure outlined above is checked by measuring the salinity of the condensate from each stage, which is the sum of the condensate from that stage and all stages operating at higher pressure. A simple material balance calculation enables one to approximate the salinity content of the condensate produced in each stage.

While the system may be operated by manual adjustment of each air bleed valve, the same effect is possible mechanically and automatically by adjusting the opening of the air bleed valve on a given stage by means of, for example, a conventional pressure controller which measures and controls the pressure in the given stage. The setting of the pressure to be controlled in each stage with proper relation to each other stage pressure allows the establishment of approximately equal condensation in each stage.

Various modifications will occur to those skilled in the art. While the system has been described for flash evaporators, it obviously can be used for any multiple evaporator system to control the rate of evaporation of each stage of the system by controlled bleed of extraneous gas into the system reducing the heat transfer capacity of the condenser responsive to such bleed. While the bleed in gas has been described as air, it can be any vaporous material which will remain in vapor form at the normal condensing temperature.

We claim:

1. In a multiple stage evaporator system, a plurality of flash evaporation stages, means for passing brine into the first stage and thence from stage to stage of the series of flash evaporators, means for withdrawing distillate and brine concentrate from the last stage, a condenser in each stage, means comprising a screen for trapping saline liquid droplets entrained in the vapors mounted before each condenser, means to maintain a vacuum in each stage comprising an air ejector connected to the last stage, and conduit means interconnecting each of the other stages in the vicinity of each condenser in parallel flow relationship to the last stage, said means for ejecting air also removing uncondensable gases from the area of each condenser, and means for introducing a quantity of air into the vapors between said trapping means and the condenser of each evaporator stage to blanket the area about each condenser to effect a vapor condensation rate in balance with other condensers of the series.

2. The multi-stage evaporator system as defined in claim 1 wherein the means for introducing air between the trapping means and the condenser is a duct interconnecting a point between the condenser and trapping means and a source of air outside the apparatus having a manually controlled valve for regulating the flow of air therein.

References Cited by the Examiner
UNITED STATES PATENTS

| | | | |
|---|---|---|---|
| 768,795 | 8/04 | Gathmann | 202—163 X |
| 1,150,439 | 8/15 | Link | 202—201 X |
| 1,204,300 | 11/16 | Moore | 202—201 X |
| 1,252,154 | 1/18 | Nenninger | 202—201 X |
| 2,613,177 | 10/52 | Worthen et al. | 202—174 |
| 2,759,882 | 8/56 | Worthen et al. | |
| 2,908,618 | 10/59 | Bethon | 202—45 X |

ROBERT F. BURNETT, *Primary Examiner.*

NORMAN YUDKOFF, *Examiner.*